July 13, 1965

R. L. SAUER 3,194,212

CATTLE GATE

Filed Feb. 27, 1964

INVENTOR
RAYMOND L. SAUER
BY
Mason, Fenwick & Lawrence
ATTORNEY

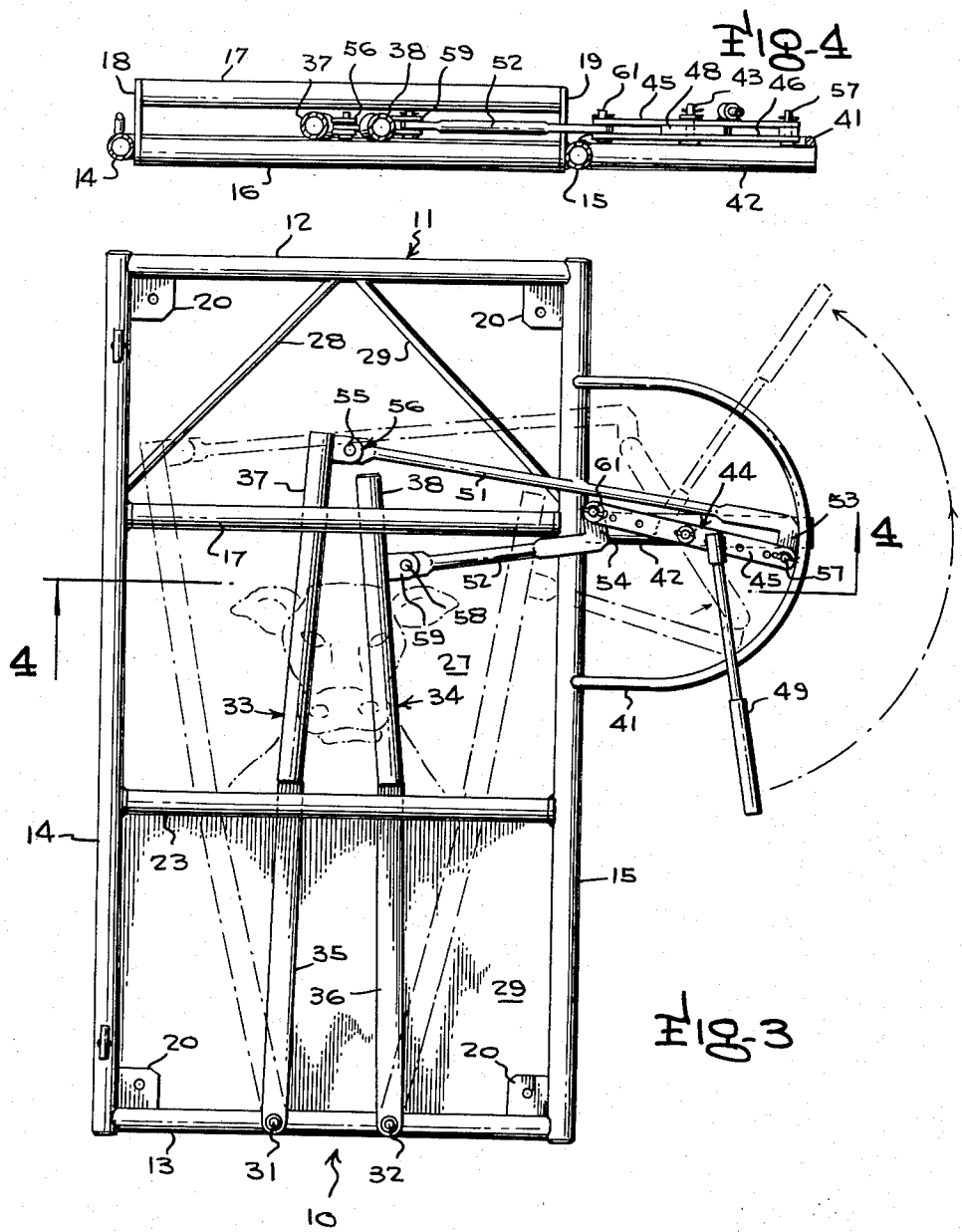

United States Patent Office 3,194,212
Patented July 13, 1965

3,194,212
CATTLE GATE
Raymond L. Sauer, Glenburnie Farms, Trevilians, Va.
Filed Feb. 27, 1964, Ser. No. 347,740
3 Claims. (Cl. 119—98)

This invention relates generally to cattle gates and more particularly to a gate that may be used at the end of an animal chute wherein the gate has an improved head clamping stanchion mechanism and locking device.

The primary object of this invention is to provide means for adjusting and locking a stanchion from a point sufficiently distant from the animal to avoid danger of personal injury by constructing the mechanism in such a manner as to allow it to be adjusted and locked within the least possible time.

Another object of this invention is the provision of a cattle gate wherein the stanchion locking mechanism cannot be released by the animal and wherein ample leverage may be obtained for moving the stanchion bars against the pressure the animal may exert upon the bars.

A further object of this invention is the provision of a cattle gate which may be easily and quickly set in position at one end of a cattle chute.

Another object of this invention is the provision of a cattle gate which will readily accommodate all sizes of animals by permitting the stanchions to be pre-set to accommodate the various sizes of animals by having one end of the stanchions maintained in a pre-set condition and the other end adjustable.

A still further object of this invention is the provision of a cattle gate that is of simple and practical construction, being of efficient and reliable operation and relatively inexpensive to manufacture and otherwise well adapted for the purposes it is intended.

Other objects, advantages and capabilities of the invention will become apparent from the following description, taken in conjunction with the accompanying drawings showing only a preferred embodiment of the invention.

In the drawings:

FIGURE 3 is a front elevational view of the cattle gate showing the stanchion portions of an entrapped animal; and FIGURE 4 is a sectional view looking upwardly and taken along lines 4—4 of FIGURE 3.

Figure 1:
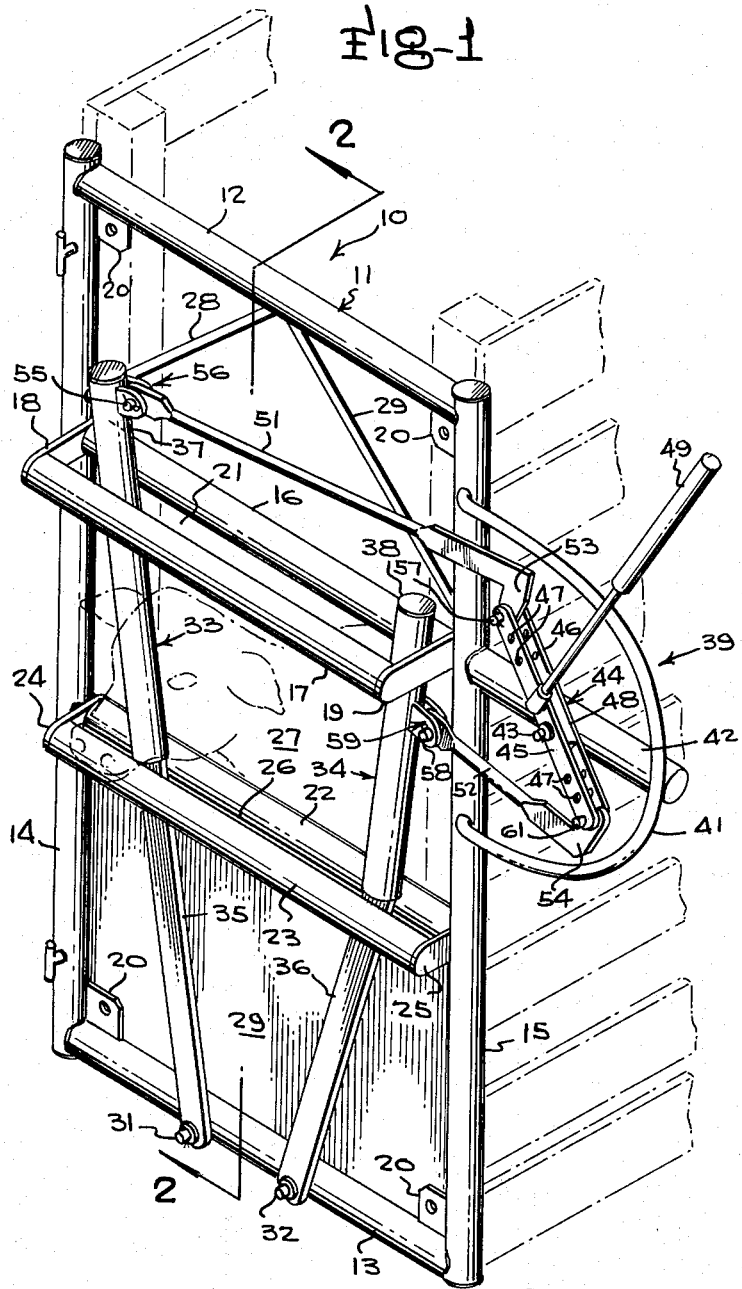
FIGURE 1 is a perspective view of the cattle gate of the present invention shown in mounted position with a cattle chute and ready to receive the head of an animal therethrough.
Figure 2:
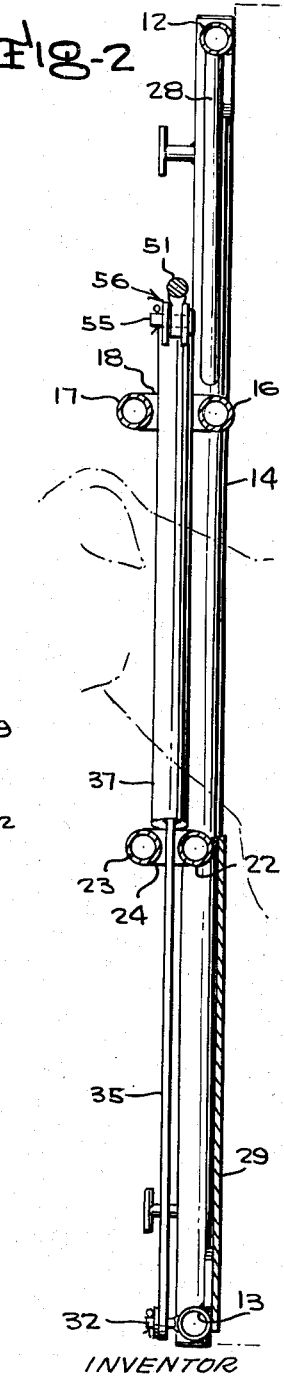
FIGURE 2 is a sectional side elevational view taken along lines 2—2 of FIGURE 1.

Referring to the drawings wherein like reference characters designate corresponding parts throughout the several figures, the cattle gate of the present invention is designated generally by the reference character 10. The cattle gate 10 is formed of an outer frame work 11 which comprises an upper horizontal member 12, a lower horizontal member 13 and a pair of vertically upstanding side members 14, 15 which are integrally connected to the upper and lower horizontal members 12, 13 respectively to form a rigid unitary structure. At the inside corners of the outer framework 11 are mounted apertured plate members 20 which are to be utilized in mounting the cattle gate 10 with one end of an animal chute. FIGURE 1 shows a preferred mounting arrangement with the chute shown in phantom lines.

Mounted in conjunction with the vertically upstanding side members 14, 15, and integrally connected therebetween, is an upper guide bar means which comprises a pair of spaced parallel horizontally disposed guide bars 16, 17 of generally tubular construction. As is to be noted, guide bar 16 lies within the plane that passes through the outer frame 11, and guide bar 17 is spaced from the guide bar 16 by spacers 18, 19 in a direction perpendicular to a plane passing through the upper horizontal member 12, the lower horizontal member 13 and the side members 14, 15 thereby defining a space 21 between guide bars 16, 17 for purposes to be later discussed. Located vertically downwardly from guide bars 16, 17 is another set of guide bars 22, 23 mounted in the same relative position to the outer frame 11 as are the aforementioned first pair of guide bars 16, 17. It will be noted here also that guide bar 22 lies between the vertically upstanding side members 14, 15 in a vertical plane that passes through the entire outer frame 11. Spacing guide bar 23 from guide bar 22 are spacers 24, 25 which are of a length suitable to define a space 26 between the guide bars 22, 23 having a magnitude that is somewhat less than space 21 of the first set of guide bars 16, 17.

Between pairs of guide bars 16, 17 and 22, 23 is defined a space 27 that is adapted to receive the head of the animal in such a position that the operative members of the gate may enclose the animals' head. To lend support to the outer frame 11 it is proposed that bracing members 28, 29 be mounted between upper horizontal member 12 and the vertically upstanding side members 14, 15 respectively and at the lower end of the gate 10 and suitably attached to lower horizontal member 13, vertically upstanding members 14, 15 and guide bar 27 a kick plate 29 be provided to prevent an animal from inserting a leg into the operative parts of the gate 10. Such a safety measure is highly desirable in implements of the type herein described in order that the animals will be fully protected from undue injury.

Extending outwardly from lower horizontal member 13 are a pair of pivot pins 31, 32 which are adapted to receive in intimate engagement the lower ends of stanchion bars 33, 34. Generally, the lower halves 35, 36 of the stanchion bars are of a rectangular cross section to permit their insertion between the lower guide bars 22, 23 which have a relatively narrow space therebetween. Such a provision insures that there will be no excessive movement of the stanchion bars 33, 34 in a direction other than that intended. The upper portions of the stanchion bars, as indicated by numerals 37, 38, are of generally tubular cross section to provide a clamping surface which has no sharp cutting edges that could possibly injure the head or neck of the animal. Upper portions 37, 38 are adapted to pivotally slide within the space 21 between upper guide bars 16, 17 upon operative movement of the stanchion bars.

To provide means for moving the stanchion bars in a manner to flank the head of the animal, there is provided a stanchion adjusting linkage indicated generally by numeral 39. The linkage 39 includes an arcuately shaped guard rail 41 extending sidewardly of vertically upstanding side member 15 and mounted intimately thereto. Also extending sidewardly from side member 15 and connecting the mid point of guard rail 41 is crossbar 42 which lies generally in a horizontal plane that also includes the upper guide bars 16, 17. Extending outwardly from the mid point of cross bar 42 is pivot pin 43 upon which crank arm 44 is mounted for pivotal movement.

Comprising crank arm 44 is a pair of longitudinally spaced flat arms 45, 46 in which there is drilled a number of apertures 47 having a purpose which will later become evident. The flat arms 45, 46 are held in spaced relation by a separator 48 which is transversely apertured so that it may also serve as a bearing surface for crank arm 44 about pivot pin 43. Fixedly mounted upon flat arm 45 is a crank handle 49 which is adapted to be grasped by the operator of the cattle gate and moved in the suitable direction to either close or open the stanchion bars at such times as it is desired to entrap or release the animal.

Separately connecting the upper portions 37, 38 of the stanchion bars with opposing ends of the crank arm 44 are linkage arms 51, 52 having an off-set portion 53, 54 respectively. Linkage arm 51 is pivotally connected to stanchion 33 by pin 55 which extends through parallel side walls of the holding bracket 56 while at the same time extending also through one end of linkage arm 51. The off-set portion 53 of linkage arm 51 is connected to crank arm 44 between flat arms 45, 46 at a desired aperture 47 by pivot pin 57. Such a connection allows free operative interconnected movement of stanchion bar 33, linkage arm 51 and crank arm 44. In a similar manner linkage arm 52 is connected to stanchion 34 by pivot pin 58 which passes through the parallel sides of holding bracket 59 and one end of linkage arm 52. To interconnect crank arm 44 and offset portion 54, linkage arm 52 lies between flat arms 45, 46 in registry with a desired aperture 47 through which pivot pin 61 passes, thereby operatively interconnecting stanchion 34 and crank arm 44 through linkage arm 52.

If it is desired to adjust the stanchions 33, 34 in order that various sizes of animals may be accommodated, it is merely necessary to reposition the offset portions 53, 54 of the linkage arms to a set of apertures 47 closer to the center of the crank arm 44. As shown in FIGURES 1 and 3, the linkage arms are positioned in the outer most apertures 47 of the crank arm. This allows the stanchions 33, 34 to move closely together for smaller animals in order that a secure fit about the head of the animal will be obtained. As can easily be seen in FIGURE 3, which represents the stanchions 33, 34 in a fully closed position, movement of offset portion 53 of linkage arm 51 to a set of apertures 47 closer to the center of crank arm would have the effect of shifting stanchion 33 away from the center of the gate and away from stanchion 34, thereby allowing a larger head space for an animal. If it is desired to get an even larger head space, the offset portion 54 of linkage arm 52 may also be moved concurrently with linkage arm 51 and in the same manner. Such an arrangement provides great versatility and ease of adjustment of the stanchions to fit various sizes of animals.

An especially important aspect of the present invention is the provision of novel stanchion self-locking means which, when the operative members are in closed position, maintain the head of the animal firmly between the stanchions 33, 34. This result is accomplished when the handle 49 is moved downwardly from the phantom line position as indicated in FIGURE 3 to the final position as shown. As the handle 49 is moved, the crank arm 44 is rotated, thereby moving linkage arms 51, 52 to close stanchions 33, 34. When the crank arm 44 is rotated to the position shown in FIGURE 3, its axis has obviously crossed an imaginary horizontal plane that passes through upper guide bars 16, 17 and the cross bar 42. This movement has also placed the pivot pin 57 that connects offset portion 53 to crank arm 44 below the above mentioned horizontal plane so that any further pressure upon stanchion 33 by a trapped animal only tends to force linkage arm 51 to move the crank arm 44 in even more of a clockwise rotation which operates to keep the stanchion in the desired location. Likewise, in the closed position the pivot pin 61 is above the imaginary horizontal plane while the main portion of the linkage arm 52 lies below the plane. Therefore, any pressure upon stanchion bar 34 will be transferred to linkage arm 52 which will tend to rotate the crank arm 44 clockwise in the locking direction.

From the above description it can be seen that a cattle gate has been provided that may be easily operated by only one person, since once the animal is entrapped between the stanchions 33, 34 and the handle 49 moved to the locked position, the operator may then move about to the duties that need to be performed upon the animal with complete peace of mind knowing that the animal is safely secured. Due to the ease of operation, safety to both man and animal, and low cost, the present invention will provide a definite improvement over the prior art.

While I have particularly shown and described one particular embodiment of the invention, it is distinctly understood that the invention is not limited thereto but that modifications may be made within the scope of the invention and such variations as are covered by the scope of the appended claims.

What is claimed is:

1. A gate for use with an animal chute including an outer framework of an upper horizontal member, a lower horizontal member, a pair of vertically upstanding side members, the improvement comprising an upper guide bar means having a pair of spaced horizontally disposed parallel guide bars affixed between the side members, one of the upper guide bars being spaced from the other upper guide bar in a direction perpendicular to a vertical plane passing through the outer framework, lower guide bar means having a pair of spaced horizontally disposed parallel guide bars affixed between the side members, one of the lower guide bars being spaced from the other lower guide bar in a direction perpendicular to a vertical plane passing through the outer framework, the lower guide bar means being located between the lower horizontal member and the upper guide bar means, the upper and lower guide bar means defining a space therebetween adapted to receive the head of an animal, a pair of co-acting stanchion bars pivotally connected to the lower horizontal member and extending upwardly and lying between the guide bars of each parallel pair of the upper and lower guide bar means, a stanchion adjusting linkage including an arcuately shaped guard rail extending sidewardly of one of the vertically upstanding side members, a cross bar lying in a horizontal plane and extending from the last mentioned side member and terminating at the mid point of the guard rail, a pivot pin extending outwardly from the mid point of the cross bar, a crank arm pivotally connected at its mid point to the pivot pin and having a plurality of apertures along the longitudinal axis thereof, a pair of off-set linkage arms operatively interconnecting the upper portions of the stanchion bars with pre-selected apertures of the crank arm, whereby when the crank arm is moved from the open position to the closed position the linkage arms pivotally move the stanchion bars together to entrap the head of an animal therebetween and when the longitudinal axis of the crank arm passes the horizontal plane of the cross bar the stanchion bars are in a locked position.

2. A gate for use with an animal chute including an outer framework of an upper horizontal member, a lower horizontal member, a pair of vertically upstanding side members, the improvement comprising an upper guide bar means having a pair of spaced horizontally disposed parallel guide bars affixed between the side members, one of the upper guide bars being spaced from the other upper guide bar in a direction perpendicular to a vertical plane passing through the outer framework, lower guide bar means having a pair of spaced horizontally disposed parallel guide bars affixed between the side members, one of the lower guide bars being spaced from the other lower guide bar in a direction perpendicular to a vertical plane passing through the outer framework, the upper and lower guide bar means defining a space therebetween adapted to receive the head of an animal, a pair of co-acting stanchion bars pivotally connected to the lower horizontal member and extending across the space defined by the upper and lower pairs of guide bars and further lying between the guide bars of each parallel pair, the stanchion bars having an upper portion of tubular cross-sectional shape and a lower portion of rectangular cross-sectional shape, a stanchion adjusting linkage including an arcuately shaped guard rail extending sidewardly of one of the vertically upstanding side members, a cross bar lying in a horizontal plane and extending from the last mentioned side member and terminating at the mid point of the guard rail, a pivot pin extending outwardly from the mid point of the cross bar, a crank arm pivotally connected at its mid point to the pivot pin and having a plurality of apertures along the longitudinal axis thereof, a pair of offset linkage arms operatively interconnecting the upper portions of the stanchion bars with pre-selected apertures of the crank arm, whereby when the crank arm is moved from the open position to the closed position the linkage arms pivotally move the stanchion bars together to entrap the head of an animal therebetween and when the longitudinal axis of the crank arm passes the horizontal plane of the cross bar the stanchion bars are in a locked position.

3. A gate for use with an animal chute including an outer framework of an upper horizontal member, a lower horizontal member, a pair of vertically upstanding side members, the improvement comprising an upper guide bar means having a pair of spaced horizontally disposed parallel guide bars affixed between the side members, one of the upper guide bars being spaced from the other upper guide bar in a direction perpendicular to a vertical plane passing through the outer framework, lower guide bar means having a pair of spaced horizontally disposed parallel guide bars affixed between the side members, one of the lower guide bars being spaced from the other lower guide bar in a direction perpendicular to a vertical plane passing through the outer framework, the upper and lower guide bar means defining a space therebetween adapted to receive the head of an animal, a pair of co-acting stanchion bars pivotally connected to the lower horizontal member and extending across the space defined by the upper and lower pairs of guide bars, the stanchion bars having an upper portion of tubular cross-sectional shape and a lower portion of rectangular cross-sectional shape, the lower portion of the stanchion bars being confined within the space defined by the pair of lower guide bars and the upper portion of the stanchion bars being confined within the space defined by the pair of upper guide bars, a stanchion adjusting linkage including an arcuately shaped guard rail extending sidewardly of one of the vertically upstanding side members, a cross bar lying in a horizontal plane and extending from the last mentioned side member and terminating at the mid point of the guard rail, a pivot pin extending outwardly from the mid point of the cross bar, a crank arm pivotally connected at its mid point to the pivot pin and having a plurality of apertures along the longitudinal axis thereof, a pair of offset linkage arms operatively interconnecting the upper portions of the stanchion bars with pre-selected apertures of the crank arm, whereby when the crank arm is moved from the open position to the closed position the linkage arms pivotally move the stanchion bars together to entrap the head of an animal therebetween and when the longitudinal axis of the crank arm passes the horizontal plane of the cross bar the stanchion bars are in a locked position.

References Cited by the Examiner

UNITED STATES PATENTS

| 2,730,072 | 1/56 | Firkins | 119—99 |
| 2,861,546 | 9/58 | Stroup | 119—98 |

FOREIGN PATENTS 738,971  10/55  Great Britain.

SAMUEL KOREN, *Primary Examiner.*

HUGH R. CHAMBLEE, *Examiner.*